May 11, 1948.  E. A. KOPS  2,441,245
FORMING DIE
Filed May 22, 1944

INVENTOR.
EARL A. KOPS
BY
A. B. Bowman
ATTORNEY

Patented May 11, 1948

2,441,245

UNITED STATES PATENT OFFICE 2,441,245

FORMING DIE

Earl A. Kops, San Diego, Calif.

Application May 22, 1944, Serial No. 536,686

4 Claims. (Cl. 153—21)

My invention relates to a forming die, more particularly for use in a hydropress for forming C sections of sheet metal and the objects of my invention are:

First, to provide a die of this class which is separable along a line parallel to the side of one inwardly extending flange of C sections to be formed thereon whereby one portion of the die is slidably removable within the formed C section facilitating the removal of finished parts from said die;

Second, to provide a die of this class in which the separable releasing part thereof gravitates into operative position when each formed part is removed therefrom;

Third, to provide a die of this class in which all the bead forming protrusions and lightening hole shearing rings are maintained in fixed position on said die during removal of finished parts therefrom;

Fourth, to provide a die of this class which will speed up production due to the simplicity of operation thereof;

Fifth, to provide a die of this class which is very strong and durable and which will produce parts very accurately after thousands of forming operations thereon;

Sixth, to provide a die of this class which is very simple of construction in accordance with the forming operation to be done thereon;

Seventh, to provide a die of this class in which the separable parts thereof automatically aline very accurately with each other after each formed part is removed therefrom so that the next part to be formed thereon may be placed in position without manually positioning any part or portion of the forming die; and Eighth, to provide a die of this class which is very simple and economical of construction, in accordance with its utility, efficient in its action and which will not readily deteriorate or get out of order.

Figure 1:
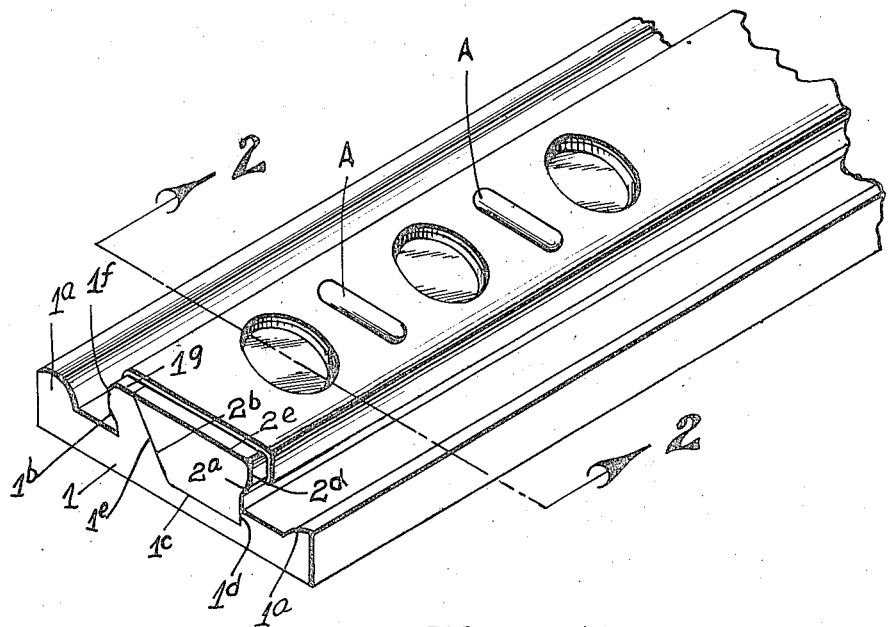
Figure 2:
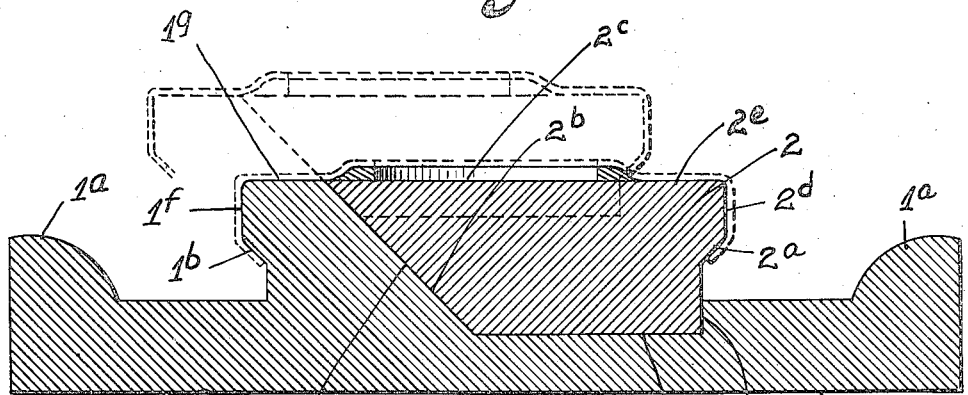

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary isometric view of my forming die showing a formed part positioned thereon and Fig. 2 is a cross sectional view taken from the line 2—2 of Fig. 1 showing by dash line a formed part on the die and further showing by dash lines the removal position of the formed part and the movable portion of the die.

Similar characters of reference refer to similar parts and portions throughout the several views of the drawings:

The base die member 1 and the movable die member 2 constitute the principal parts and portions of my forming die.

The base die member 1 is arranged to be positioned on the anvil of a hydropress which is the type of press employing a hydraulically operated rubber forming cushion which forms sheet metal parts on dies by compression of the rubber against the parts to be formed whereby said parts are made to conform with the figure of the die.

The base die member 1 is provided with feed back ledges 1a which are arranged to guide the compressed rubber inwardly toward the flange forming ledges 1b and 2a. The base die member 1 is also provided with a recess 1c adapted to receive the lower side of the movable die member 2. This recess 1c is provided with a vertical ledge 1d which is provided to restrain the movable die member 2 against lateral movement. It will be noted that the movable die member 2 is provided with an angularly inclined side 2b which conforms with the surface 1e of the base die member 1. The parting line between these surfaces 1e and 2 is substantially parallel to the surface of the ledge 1b. Rigidly connected with the movable die member 2 are the lightening hole shearing rings 2c. As shown in Fig. 1 of the drawings, the formed part is provided with beads A which are formed over raised fixtures on the movable die member 2. The shearing rings 2c and other fixtures on the movable die member 2 may be varied according to the requirements of the particular part to be formed. It will be noted that the formed part, as shown in Fig. 2 of the drawings, is provided with inwardly extending flange portions which underlie the ledges 1b and 2a. The general cross sectional shape of the parts to be formed on my forming die is a C section.

The ledges 1b and 2a of the base die member 1 and the movable die member 2 are undercut portions inwardly extending from the sides 2b and 1f of the movable die member 2 and the base die member 1. The upper surfaces of the base die member 1 and the movable die member 2 are flush and normally used in a horizontal plane.

The operation of my forming die is substantially as follows: When my forming die, as shown by solid lines in Fig. 2 of the drawings, is positioned on the anvil of a hydropress, a flat piece of metal is placed on the upper surfaces 1g and 2e of the base die member 1 and the movable die member 2. The rubber pad of the hydropress moves downwardly vertically from above and forces the flat sheet of metal downwardly over the sides 1f and 2d and inwardly beneath the undercut surfaces of the ledges 1b and 2a. The rubber pad of the hydropress is then raised and the movable die member 2 is shifted in a direction parallel to the parting line between the surfaces 1e and 2b whereby the inwardly formed flange of the part is relieved from the undercut surface of the ledge 1b which is parallel to said parting line. After the inwardly formed flange is removed from the ledge 1b it is then shifted in a direction parallel to the surface of the ledge 2a and removed from the movable die member 2. When the finished part is thus removed the movable die member 2 falls back into its operative position in the recess 1c of the base die member 1. The forming operation may then be repeated.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. A forming die of the class described, consisting of a base die member and a movable die member, both of said die members being contiguous to each other and forming a common upper surface, each of said die members having opposite side portions and inwardly undercut portions at their outer side portions, the parting line of said base die member and said movable die member being angular and substantially parallel with the surface of one of said inwardly undercut portions.

2. A forming die of the class described, consisting of a base die member and a movable die member, both of said die members being contiguous to each other and forming a common upper surface, each of said die members having opposite side portions and inwardly undercut portions at their outer side portions, the parting line of said base die member and said movable die member being angular and substantially parallel with the surface of one of said inwardly undercut portions, said base die member having a recess arranged to receive said movable die member.

3. A forming die of the class described, consisting of a base die member and a movable die member, both of said die members being contiguous to each other and forming a common upper surface, each of said die members having opposite side portions and inwardly undercut portions at their outer side portions, the parting line of said base die member and said movable die member being angular and substantially parallel with the surface of one of said inwardly undercut portions, said base die member having a recess arranged to receive said movable die member, said recess portion in said base die member having a vertical side wall arranged to prevent lateral movement of the movable die member with respect to the base die member.

4. A forming die of the class described, consisting of a base die member and a movable die member, both of said die members being contiguous to each other and forming a common upper surface, each of said die members having opposite side portions and inwardly undercut portions at their outer side portions, the parting line of said base die member and said movable die member being angular and substantially parallel with the surface of one of said inwardly undercut portions, and feed back portions on said base die member extending upwardly in spaced relation to the inwardly undercut portion and arranged to feed a forming pad inwardly against a part on said inwardly undercut portion.

EARL A. KOPS.

REFERENCES CITED

The following references are of record in the file of this patent:

UNITED STATES PATENTS

| Number | Name | Date |
|---|---|---|
| 1,941,078 | Eriksson | Dec. 26, 1933 |
| 2,263,037 | Gits | Nov. 18, 1941 |
| 2,297,625 | Kotcher | Sept. 29, 1942 |
| 2,322,908 | Poux | June 29, 1943 |
| 2,377,664 | Berger | June 5, 1945 |
| 2,402,836 | Nielsen | June 25, 1946 |